United States Patent [19]

Stephens

[11] Patent Number: 5,063,967

[45] Date of Patent: Nov. 12, 1991

[54] PUMPABLE CEMENT GROUT

[76] Inventor: Patrick J. Stephens, 1276 Chuckanut Dr., Bellingham, Wash. 98225

[21] Appl. No.: 446,612

[22] Filed: Dec. 6, 1989

[51] Int. Cl.$^5$ ............................................. F16L 55/18
[52] U.S. Cl. ...................................... 138/98; 138/97; 264/269
[58] Field of Search ................... 138/97, 98, 105, 140; 264/36, 269; 156/94, 294; 405/150, 154

[56] References Cited

U.S. PATENT DOCUMENTS

| | | | |
|---|---|---|---|
| 3,774,403 | 11/1973 | Cushing | 138/105 |
| 4,170,248 | 10/1979 | Bennett et al. | 138/97 |
| 4,678,370 | 7/1987 | Allen | 138/97 |
| 4,867,203 | 9/1989 | de Pulter | 138/98 |
| 4,938,627 | 7/1990 | Lee | 405/154 |
| 4,948,298 | 8/1990 | Hayden | 138/97 |
| 4,954,016 | 9/1990 | Stopgard | 405/154 |
| 4,956,032 | 9/1990 | Hahn et al. | 138/97 |

OTHER PUBLICATIONS

Mearl Corporation, Technical Bulletin G-102, dated Jun. 1986.
Mearl Corporation, Technical Bulletin FC706, dated Dec. 1987.
Cellufoam Concrete Systems, Brochure 03362, dated Jun. 1987.

*Primary Examiner*—James E. Bryant, III
*Attorney, Agent, or Firm*—Hughes & Multer

[57] ABSTRACT

A pumpable cement grout and method for use thereof for grouting of annular cavities. There is a pumpable cement grout having portland cement, water in an amount sufficient so that the water-to-cement ratio of the grout is from about 0.6 to about 0.68 by weight, and pregenerated aqueous foam in an amount sufficient to adjust the wet density of the grout to a value of from about 55 to about 72 pounds per cubic foot. The grout is pumped into an annular cavity formed intermediate a tubular external member having a longitudinal extent and an internal member disposed in the tubular external member, so that the grout fills the cavity by flowing in a generally longitudinal direction through the tubular external member. The tubular external member may be a concrete sewer pipe, and the internal member may be a plastic liner pipe. The pressure at which the grout is injected into the annular cavity may be maintained at or below a predetermined maximum pressure, so as to avoid collapsing the plastic liner pipe.

7 Claims, 2 Drawing Sheets

PUMPABLE CEMENT GROUT

BACKGROUND OF THE INVENTION

1. Field of the Invention

The present invention relates generally to cement grouts and methods for use of the same. More particularly, the present invention relates to a pumpable cement grout for grouting of annular cavities.

2. Background Art

Much of the infrastructure of modern society is in need of repair or upgrading, or, at the least is in need of means for reducing the frequency of such required repairs or upgrading. For example, it is well known that a great many sewer systems and bridges throughout the United States and elsewhere are greatly in need of upgrading or frequent repair.

One relatively new and effective technique that has been used for upgrading sewer systems involves relining existing concrete sewer lines with plastic liner pipe, such as high density polyethylene (HDPE) pipe. The plastic liner is inserted into the sewer line, and is pulled or jacked longitudinally through the sewer line into place. In order to fit within the concrete sewer line, however, the plastic liner pipe must necessarily have an outside diameter which is smaller than the inside diameter of the concrete sewer pipe, so as to provide clearance between the two. Accordingly, an annular cavity is formed between the concrete sewer pipe and the plastic liner pipe. Concrete sewer pipes may typically range in size from an inside diameter of 15 inches or less, to an inside diameter on the order of 60 inches. Accordingly, it will be understood that it is typically at least very difficult, and usually virtually impossible, for personnel or construction equipment to enter a sewer pipe to install or backfill a plastic liner.

While, as noted, the plastic liner pipe necessarily has an outside diameter which is somewhat less than the inside diameter of the concrete sewer pipe, so as to permit movement of the liner pipe within the sewer pipe, it is not desirable that the liner pipe be very much smaller in diameter than the sewer pipe, lest the capacity of the upgraded sewer system be severely reduced. Accordingly, plastic liner pipes are typically installed so that there is adequate, but minimal clearance between the outside of the liner pipe and the interior surface of the sewer pipe; in a typical installation, the radial clearance (i.e. the radial extent of the annular gap) may range from on the order of 3 inches to less than 1 inch.

Once the plastic liner pipe has been pulled or jacked into place, and the annular space between the old pipe and the new liner has been formed, it is typically desirable or necessary to fill the annular space with grout to protect the liner from future damage. The potential for such damage may exist, for example, when the old concrete pipe is badly deteriorated and there is a danger that portions of the wall of the pipe may fail. A material which has been found effective in providing such protective grouting is concrete grout which, in conjunction with the inexpensive plastic liner pipe, provides the potential for old sewers to be rehabilitated with minimal excavation and cost. As noted above, however, direct access to the interior of the sewer line by personnel and construction equipment is typically difficult or impossible; this precludes the possibility of grouting of the pipe liner by means of the conventional cement grouting techniques which are used for the backfilling of large tunnels and similar structures, which typically involve boring holes through the wall of the tunnel at a multiplicity of points along the length of the tunnel, and then injecting cement grout through the holes and into each local area of the cavity about the tunnel.

Because of such inability to apply proven conventional techniques, grouting of the plastic pipe liners has been attempted by injecting a cement grout into the annular cavity at a first point in the pipe so that the grout flows longitudinally through the pipe towards a second point in the pipe. A very serious problem has, however, been encountered when attempting to grout the plastic liners by flowing the cement grout longitudinally through the sewer pipe, because the plastic liner pipe itself is typically unable to resist the significant external pressures which are exerted by the injected concrete grout. As noted above, the volume of space between the plastic liner pipe and the existing sewer pipe is typically small; hence, it is typically very difficult to maintain a low grout pressure when injecting the grout longitudinally through the annular cavity. The plastic liner pipe can easily collapse under such injection pressure, some pipes being unable to withstand external pressures as low as 3 pounds per square inch (psi). For example, a plastic liner pipe which is commonly used for lining sewer pipe is high density polyethylene (HDPE) pipe having a wall thickness of SDR 32.5 (where SDR is the ratio of outside diameter-to-wall thickness). HDPE pipe having a wall thickness of SDR 32.5, while able to contain significant internal pressures, has a tendency to collapse within one day if subjected to an external pressure in excess of 4 psi. Another, less commonly used size of HDPE pipe has a wall thickness of SDR 26, and tends to collapse when subjected to an external pressure in excess of 8 psi. Such external pressure maximums can easily be exceeded when using the typical longitudinal injection techniques described above to inject conventional cement grouts. The conventional cement grouts generally exhibit fairly high viscosities, and relatively high injection pressures are thus required to force the grouts along the annular cavity. Furthermore, as the grout moves through the annular cavity, the grout tends to hydrate (i.e. bind or set up due to the chemical reaction between the portland cement and water in the grout), particularly if the concrete sewer pipe and/or plastic liner are dry, thus compounding the difficulty of maintaining a low grout injection pressure. These problems become critical when long distance are encountered between sequential injection points, in other words, when the individual runs to be grouted between access points are fairly long. This is often the case in conventional city sewers, where the distance between access points provided by manholes may often be on the order of 300 to 500 feet. In some such cases, the contractors performing such grout work, if using conventional cement grouting materials as described above, have resorted to drilling additional access holes vertically through the pavement and soil overlying the sewer pipe so as to provide additional grout injection points, which is obviously a time-consuming and costly makeshift approach.

In the event that the plastic liner collapses during the grout injection, however, the consequences may be catastrophic for the job. Not only is the flow of sewer water through the sewer line blocked by such a collapse, which may result in an overflow, but it is also frequently necessary to then excavate and replace the entire section of sewer line in which the liner is collapsed, at great expense. Accordingly, there exists a need for a grout material, and method for use thereof, which is both effective and inexpensive, yet which reduces the possibility of collapse of the plastic liner pipe during grouting of the liner in a sewer line.

Another significant group of structures within the national infrastructure which are often in need of repair or upgrading are our bridges. In particular, a number of such bridges use wire or cable stays to support the bridge structure. Such stays typically run from a bottom anchor to a tower, from which the bridge span may be supported. Most typically, each individual wire stay comprises a wire or strand bundle having a multiplicity of individual wires therein. Such wires are very frequently manufactured of a high tensile strength steel, which will quickly corrode if exposed to weather. Accordingly, if such wires remain exposed to the elements, burdensome maintenance expenses may be incurred. A number of attempts have been made to enclose such wire bundles in protective sheathes. As with the sewer liner pipes described above, such protective sheathes may be polyethylene pipe; when such plastic pipe, such as high density pipe is installed about the wire bundle, an annular cavity is formed between the external pipe and the internal wire bundle.

A number of attempts have been made to grout or otherwise fill the annular space between the polyethylene pipe and the wire bundle, in large part to prevent any water which may penetrate the pipe from coming into contact with the wire bundle. Such attempts have encountered a number of significant difficulties. For example, it will be understood that such wire stays typically tend in a somewhat vertical direction; accordingly, one end is typically at a much higher elevation than the other end. When grouting of the wire stays is performed, the grout is injected through the pipe at a relatively low point along the stay, and rises upwardly through the pipe along the stay, so as to achieve the desired uniformity and freedom from air gaps. As the top of the column of grout in the pipe proceeds to greater heights, greater and greater static head pressures will be generated. This, in combination with the friction generated by the flow of the relatively viscous conventional grout through the pipe and around the wire bundle and the hydration of the grout, as described above, will necessitate greater and greater injection pressures to continue the injection of the grout. In extreme cases, the injection pressure may reach a point where the polyethylene pipe sheath may rupture. Alternatively, the sheathed wire stay may be grouted in relatively short stages so as to avoid development of excessive injection pressures; performing the grouting in such relatively short stages, however, is quite inefficient, and compounds the time and cost required to perform the job. Furthermore, conventional non-foamed grout mixes impose undesirably large weight loads on the cable stays, and, when cured, exhibit only minimal shock absorption capabilities for such applications.

Accordingly, there exists a need for a lightweight grout suitable for use in filling an annular cavity intermediate a wire bundle of a wire bridge stay and a sheath about the bridge stay so as to provide effective protection for the wire bundle.

SUMMARY OF THE INVENTION

The present invention comprises a lightweight, pumpable cement grout. The grout comprises portland cement, water in an amount sufficient so that the water-to-portland cement ratio of the grout is from about 0.6 to about 0.68 by weight, and pregenerated aqueous foam in an amount sufficient to adjust the weight density of the grout to a value of from about 55 to about 72 pounds per cubic foot.

The lightweight pumpable cement grout may comprise, by weight, portland cement, in a weight from about 1093 pounds to about 865 pounds per cubic yard of grout, water in a weight from about 0.6 to about 0.68 times the weight of the portland cement per cubic yard of grout, and pregenerated aqueous foam having a density of about 2.4 pounds per cubic foot, in a weight from about 22.7 to about 31.50 pounds per cubic yard of grout.

A method is provided for grouting an annular cavity formed intermediate a tubular external member having a longitudinal extent and an internal member disposed in the tubular external member. A pumpable cement grout is formed comprising portland cement, water in an amount sufficient so that the water-to-portland cement ratio of the grout is from about 0.6 to 0.68 by weight, and pregenerated aqueous foam in an amount sufficient to adjust the wet density of the grout to a value of from about 55 pounds per cubic foot to about 72 pounds per cubic foot. The pumpable cement grout is pumped into the annular cavity so that the grout fills the cavity by flowing in a generally longitudinal direction through the tubular external member. The tubular external member may be a concrete sewer pipe, and the internal member may be a plastic liner pipe.

In a preferred embodiment of the present invention, a method is provided for lining a subterranean sewer line, the sewer line having an internal diameter equal to or less than about 60 inches. There is access to the interior of the sewer line from the surface at first and second manholes longitudinally spaced apart along the sewer line. A high density polyethylene pipe is placed in the sewer line, the polyethylene pipe having an external diameter such that an annular cavity having a radial extent equal to or less than about 3 inches is formed intermediate the sewer line and the polyethylene pipe. The polyethylene pipe has a tendency to collapse if subjected to an external pressure in excess of a predetermined maximum pressure, the predetermined maximum pressure being equal to or less than about 10 pounds per square inch. Pumpable cement grout is formed, comprising portland cement, water in an amount sufficient so that the water-to-portland cement ratio of the grout is from about 0.6 to about 0.68 by weight, and pregenerated aqueous foam in an amount sufficient to adjust the wet density of the grout to a value of from about 55 pounds per cubic foot to about 72 pounds per cubic foot. A dam is formed about the polyethylene pipe so as to seal the annular cavity between the pipe and sewer line at the first access manhole. The dam has an injection port therethrough for establishing communication between the surface and the annular cavity. The cement grout is pumped under pressure into the annular through the injection port so that the cement grout fills the annular cavity by flowing in a generally longitudinally direction along the sewer line, the pressure under which the cement grout is pumped into the annular cavity being maintained about at or below the predetermined maximum pressure. The pumping of the cement grout into the annular cavity is terminated when the flow of grout along the sewer line reaches the second access manhole.

A grouted casing in accordance with the present invention is also provided which comprises a tubular external member having a longitudinal extent, an internal member disposed in the tubular external member so as to form an annular region intermediate the tubular member and the internal member, and solidified cellular cement grout filling the annular region intermediate the external and internal members. The solidified cellular cement grout is a product of hydration of the pumpable cement grout described above.

These and other features of the present invention will become apparent from the following detailed description.

DESCRIPTION OF THE PREFERRED EMBODIMENTS

Figures 1, 2:
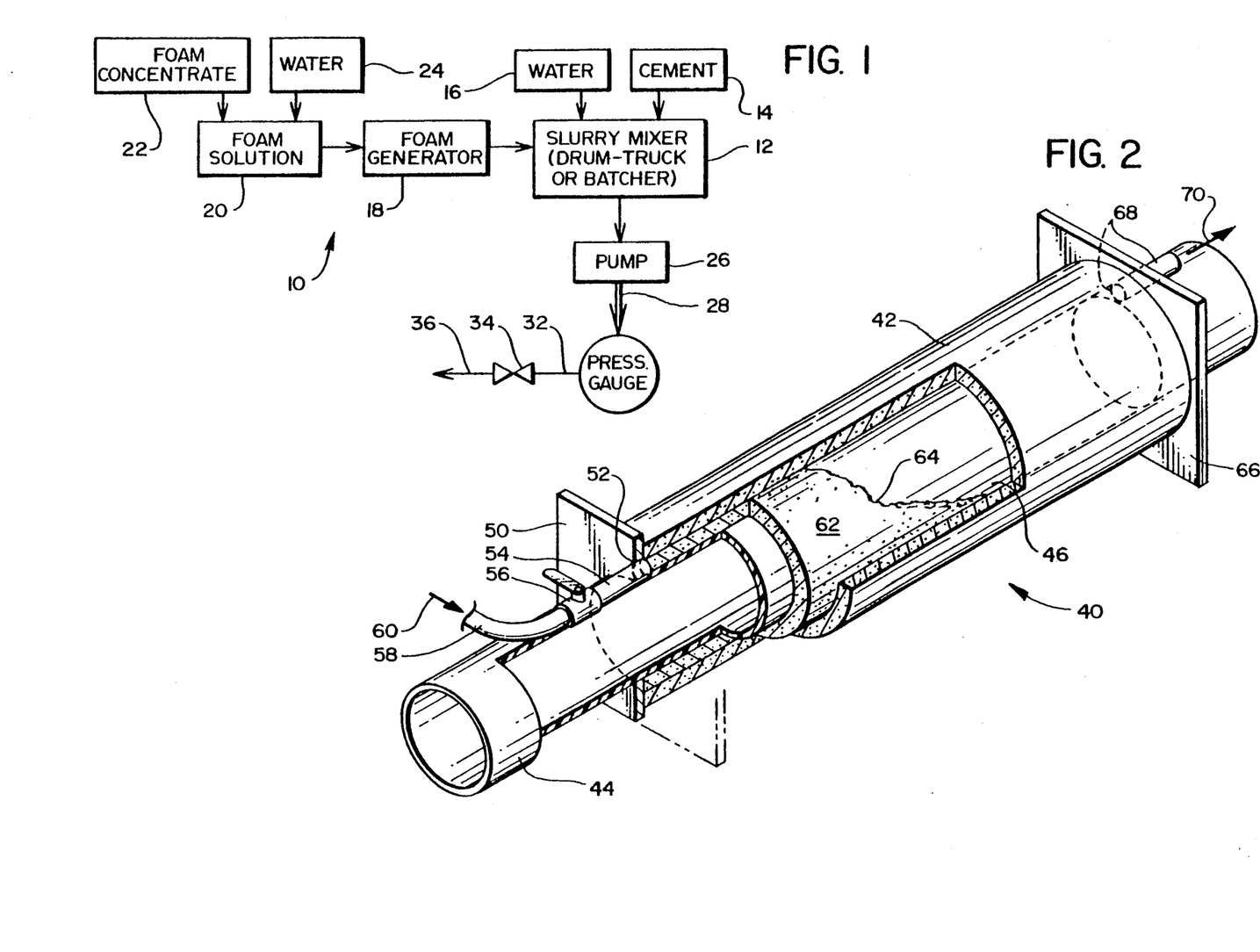
FIG. 1 is a block diagram representation of the apparatus for generating the pumpable cement grout of the present invention.
FIG. 2 is a perspective view of a length of concrete sewer pipe having a plastic liner pipe installed and grouted therein in accordance with the present invention.

With reference to FIG. 1, there is shown a block diagram of an apparatus 10 for generating the lightweight pumpable cement grout of the present invention. Grout generating apparatus 10 comprises a slurry mixer 12. Slurry mixer 12 may be, for example, a drum-truck, such as a conventional cement truck, or a conventional cement mix batcher. Slurry mixer 12 receives cement 14 and water 16 therein for mixing. Cement 14 is preferably conventional portland cement. Portland cements are hydraulic cements composed primarily of hydraulic calcium silicates, and are well known to those skilled in the art. Such hydraulic cements set by reacting chemically with water. During this reaction, called hydration, cement combines with water to form a stonelike mass. Such hydration begins as soon as the portland cement comes in contact with water.

Water 16 may be any water which is suitable for causing hydration of cement 14. For applications where the resulting grout may be in contact with corrodible components, such as high tensile strength steel wires in bridge wire stays, it is preferable that water 16 be free of chloride, sulfate, and other ions which might cause corrosion when in contact with the corrodible component. Water 16 is combined with cement 14 in slurry mixer 12. Sufficient water 16 is added to cement 14 so that the water-to-cement ratio of the mixture is from about 0.6 to about 0.68 by weight. This water-to-cement ratio is higher than that used in conventional lightweight cellular cement mixes, and helps the pumpable cement grout of the present invention achieve a desirably low viscosity. For example, roof deck type mixes, which are used to form lightweight cement roofs, may typically have a water-to-cement ratio of approximately 0.5; such conventional roof deck type mixes, having such a lower water-to-cement ratio, are significantly more viscous than the grout of the present invention, and, consequently, would require significantly higher pressures to inject into the annular space between the liner and sewer pipe. For reasons which will be discussed in greater detail below, however, such lower water-to-cement ratio is necessary for such roof deck type mixes so that the cement will set up before the bubble structure dissipates. Furthermore, the relatively high viscosity of conventional roof deck type mixes is desirable for their intended application.

In terms of weight-per-yard, cement 14 is added to slurry mixer 12 at a rate of from about 1093 pounds to about 865 pounds per cubic yard of produced grout. Water 16 is added at a rate from about 0.6 to about 0.68 times the weight of the cement.

Slurry mixer 12 also receives pregenerated aqueous foam from foam generator 18. Foam generator 18 may be any suitable conventional foam generation system, such as those used for the production of cellular concrete, as are known to those skilled in the art. For example, such systems include positive displacement foam generating pumps having rotors for mixing liquid foam solution with air, such as, for example, the mechanical foam generation system supplied by Cellufoam Concrete Systems (a division of Patrick Chadwick Incorporated, 110 Pine Glen Road, Toronto, Ontario M4E 1K9) as their Model 620-114-1, and batch-type systems which mix a pressurized foam solution stream with a pressurized air stream in a nozzle or column to produce the preformed foam, such as, for example, the batch type preformed foam system supplied by The Mearl Corporation (220 West Westfield Avenue, Roselle Park, N.J. 07204) as their Model OT 10-5.

As noted above, foam generator 18 mixes foam solution and air to generate preformed aqueous foam. Accordingly, foam generator 18 receives foam solution 20, typically from a mixing and storage tank. Foam solution 20, in turn, is formed of a mixture of foam concentrate 22 and water 24. Most preferably, foam concentrate 22 and water 24 are mixed to form foam solution 20 in proportions which, when used in conjunction with foam generator 18, produce a suitable micro cellular foam having a density of about 2.4 pounds per cubic foot, although other relatively light densities of preformed foam may be used as well. Foam concentrate 22 may be a suitable foam-forming surfactant material, such as, for example, an alcohol sulfate diethanolamine salt sold under the trademark "DUPONOL" EP Surfactant by E. I. Du Pont de Nemours and Company, Inc., (1007 Market Street, Wilmington, Del. 19898). "Duponol" EP Surfactant is a neutralized reaction product of chlorosulfonic acid with laurylalcohol, predominantly a diethanolamine salt of lauryl sulfate water. Similar suitable materials are available from The Mearl Corporation under the trademark "MEARLCEL 3532 FOAM LIQUID", from Cellufoam Concrete Systems under the trademark "WF304 Foam Concentrate", and from Elastizell Corporation of America (P.O. Box 1462, Ann Arbor, Mich. 48106) under the trademark "Elastizell EF". Another example of foam concentrate which may be suitable for some applications of the present invention is available under the trademark "MEARL GEOFOAM LIQUID" from The Mearl Corporation, which is an aqueous concentrate of a surface active polypeptide-alkylene polyol condensate. It will be noted, however, that some foam concentrates, such as the Mearl Geofoam Liquid, may contain chloride ions and other corrosive components which may limit their desirability in applications where the cement grout of the present invention is placed in contact with steel or other corrodible components.

Foam concentrate 22 is selected, and mixed with water 22 in suitable proportions, so that a suitable voluminous and stable micro bubble pregenerated aqueous foam is produced when the foam solution passes through foam generator 18. The preformed aqueous foam produced by foam generator 18 creates a multiplicity of air voids about which a subsequent cement matrix may form, thus forming a low density concrete. As described above, the preformed foam is generated by introducing controlled quantities of air, water, and foam concentrate into the foam generator. The preformed foam is then blended with the cement slurry in a suitable mixing device, either batch or continuous. The pregenerated aqueous foam suitable for use in the present invention needs to have sufficient stability to maintain its structure until the cement sets to form the matrix of low density concrete. Foam generation and proportioning of the cement slurry are regulated to achieve control of final strength and density.

Most preferably, the density of the preformed aqueous foam suitable for use in the present invention is about 2.4 pounds per cubic foot. Using the commercially available foam concentrates noted above, it has been found that a foam solution 20 comprising two to five percent by volume foam concentrate generally produces foam having suitable density and stability, as well as micro bubble characteristics; a foam solution comprising two-and-a-half percent by volume foam concentrate has been found to be particularly suitable for use in the present invention. The proportion of foam concentrate and water in the foam solution may, of course, need to be adjusted to compensate for field conditions or different concentrations of foam concentrate, so as to ensure that suitable preformed foam is generated.

With further reference to FIG. 1, it will be noted at this point that cement 14 may be any suitable hydraulic cement which undergoes hydration in contact with water. Types I and II cement have been found to be particularly preferable for use in the present invention, and noncorrosive cement compounds should be used if the grout is to be placed in contact with corrodible materials, such as steel. Furthermore, it should be understood that cement 14 will generally be free of mineral aggregates, fly ash, and the like, which would ordinarily increase the density of the resulting cement grout, although such fillers may be desirable in some applications of the present invention.

With further reference to FIG. 1, it will be seen that the preformed aqueous form formed by foam generator 18 is fed into slurry mixer 12 for mixing with water 16 and cement 14 to produce the pumpable cement grout of the present invention, which itself will be described in greater detail below. The pumpable cement grout is drawn from slurry mixer 12 to pump 26, which pressurizes the pumpable cement grout for subsequent injection under pressure. Pump 26 discharges the pumpable cement grout of the present invention through hose line 28 to pressure gauge 30, by which an operator may check the injection pressure of the pumpable cement grout, and adjust pump 26 accordingly. From pressure gauge 30, the pumpable cement grout passes through injection line 32 to valve 34. Valve 34 permits an operator to selectively commence and terminate injection of the pumpable cement grout. When valve 34 is open, the pumpable cement grout is discharged through injection fitting 36, as indicated by the arrow, into a void which is desired to be grouted in accordance with the present invention.

The grout generating equipment described above with reference to FIG. 1 is normally very portable, and can be transported to a typical job site using a pickup truck.

Having described the equipment and materials suitable for generation of the pumpable cement grout of the present invention, attention is now directed to FIG. 2, with reference to which the grouting of an exemplary annular void will be described. With reference to FIG. 2, there is shown generally a sleeved or lined sewer line 40. Sewer line 40 comprises sewer pipe 42, which may typically be a concrete sewer pipe which is in need of upgrading. As noted above, such concrete sewer pipe may typically range in size up to about 60 inches in inside diameter, which, while relatively large for a sewer line, still provides inadequate space for personnel and grouting equipment to enter the pipe. A liner pipe 44 is disposed in sewer pipe 42 so that liner pipe 44 extends continuously through sewer line 42, thereby providing the new, replacement conduit for the flow of the sewer water carried by sewer line 40. Liner pipe 44, as noted above, may typically be a plastic pipe, such as an HDPE liner pipe, which is subject to collapse if an external pressure in excess of a predetermined maximum pressure is applied to the liner pipe. As also noted above, such liner pipe is typically placed in and then pulled or jacked through sewer pipe 42; accordingly, the external diameter of liner pipe 44 is smaller than the internal diameter of sewer pipe 42, so that an annular gap or void 46 is formed when liner pipe 44 is installed in sewer pipe 42. In typical applications, the radial extent of annular void 46 may vary from about one to about three inches.

As the next step in the practice of the present invention, a bulkhead or dam 50 may be installed at a first access point along sewer line 40 so as to seal the annular gap between sewer pipe 42 and liner pipe 44. As noted above, such access points along a sewer line are typically provided by access manholes, which extend downwardly from the surface to the sewer pipe. Such access manholes may be spaced along a sewer line at longitudinally spaced apart distances of 300 to 500 feet or more. Such access manholes are normally of adequate size so as to permit personnel and equipment to gain access to the end or portion of the sewer line which is exposed at the access manhole. Accordingly, at a first point along sewer line 40, which first point will be understood to be typically provided by a first access manhole, dam 50 is installed so as to substantially continuously surround liner pipe 44 and abut against the exposed end of sewer pipe 42, thereby sealing the annular gap between the pipes. Dam 50 may preferably be a boardlike dam, as illustrated in FIG. 2, which may be constructed of wood, plastic, metal, and the like, or may be a built-up dam of earthen materials, gravel, sand, and the like, if sufficient strength to resist the injection pressure of the grout can be achieved. Dam 50 is provided with an injection port 52, through which an injection nozzle 54 can be inserted. Accordingly, it will be understood that injection port 52 establishes communication between the surface, via the access manhole, and annular cavity 46 between the pipes. It will also be understood that injection nozzle 54 corresponds to injection nozzle 36 shown in the block diagram of FIG. 1.

Valve 56, which may be manually operable and which corresponds to valve 34 shown in the schematic diagram of FIG. 1, is provided to control the flow of pumpable cement grout from pressure line 58 to nozzle 54, and hence into annular void 46. When valve 56 is in an open position, the grout is supplied under pressure from the grout-generating apparatus through supply line 58 in the direction shown by arrow 60.

With further reference to FIG. 2, there is seen grout 62, in accordance with the present invention, as it is injected to annular cavity 46 through injection nozzle 54. As grout 62 is injected into annular cavity 46, grout 62 flows around liner pipe 44 and longitudinally through sewer pipe 42 so as to fill annular cavity 46. Thus, it will be seen that a leading edge 64 of grout 62 proceeds longitudinally through annular cavity 46 between the first access point (typically provided by a first access manhole) towards a second access point (typically provided by a second access manhole). A second dam 66 may be provided at the second access point, and may have an ejection port 68 therethrough. As leading edge 64 of injected grout 62 proceeds longitudinally within sewer line 40, air will be forced out of annular cavity 46. This air may escape through ejection port 68 in the direction shown by arrow 70. When leading edge 64 of grout 62 reaches the second access point at second dam 66, grout 62 will begin escaping from ejection port 68, indicating to an observer that grouting of the section of sewer line 40 between the first and second access points has been completed. It will be understood, of course, that it may be preferable under some circumstances to delete second dam 66 and ejection port 68, so as to permit the air and grout to simply escape from the annular gap between the two pipes at the second access point, particularly if it is likely that considerable soil or other debris will be forced out of annular cavity 46 by the advance of grout 62 therethrough.

With further reference to FIG. 2, the pumpable cement grout 62 of the present invention will now be described in greater detail. Pumpable grout 62, which is produced in slurry mixer 12 shown in FIG. 1, is provided with suitable characteristics to permit it to be injected into an annular space, such as that shown in FIG. 2, under minimal pressures, so as to avoid collapsing the liner pipe. This characteristic needs to be retained by the pumpable grout while it proceeds through the entire length of the sewer line between the first access point and the second access point. For example, as leading edge 64 of grout 62 shown in FIG. 2 advances along sewer line 40, that portion of grout 62 which is proximate leading edge 64 will be hydrating (i.e. setting up), which hydration may be accelerated if the interior surface of sewer pipe 42 or exterior surface of liner pipe 44 is dry or the sewer pipe is warm because of warm sewer water flowing therethrough, as fresh grout is pumped into annular cavity 46 at injection nozzle 54; despite this hydration, grout 62 needs to remain sufficiently fluid until leading edge 64 reaches the second access point, so as to avoid excessive injection pressures. On the other hand, however, grout 62 must be capable of setting up (i.e. solidifying) so as to form the solid cellular concrete matrix before the bubble structure of the cement grout collapses or dissipates. In other words, the pumpable cement grout must be fluid enough to be pumped into the annular cavity under low pressure, yet be able to set up without excessive delay.

The pumpable cement grout of the present invention achieves these desired characteristics. First, the cement grout of the present invention has an initial consistency upon formation which is very thin and "runny", so that it may be injected under very low pressures; the initial consistency of the grout of the present invention may aptly be described as similar to that of cream. This consistency is achieved in part by mixing water with the cement in the slurry mixer in an amount sufficient so that the water-to-portland cement ratio of the grout is from about 0.6 to about 0.68 by weight; in other words, the weight of the water in a given amount of the grout is from about 0.6 to about 0.68 times the weight of the portland cement in that amount of the grout. This is a significantly higher water-to-cement ratio than that utilized in conventional roof deck type cellular concrete mixes, and consequently provides the grout of the present invention with a much thinner and more easily pumped consistency.

The cement grout of the present invention further comprises an amount of the pregenerated aqueous foam, which is sufficient to adjust the wet density of the grout to a value of from about 55 to about 72 pounds per cubic foot. In some cases, it may be desireable to adjust the wet density of the grout upwardly to a value of about 75 pounds per cubic foot. For use in grouting liners in sewer lines, as described with reference to FIG. 2, it is preferable that the pregenerated aqueous foam be incorporated in the grout in an amount sufficient to adjust the wet density thereof to a value of from about 55 to about 62.4 pounds per cubic foot; within this range, the density of the grout of the present invention is generally less than that of the sewer water being carried through the sewer liner, which typically has a density of about 62.4, thus preventing the sewer liner from floating on the grout during the grouting of the sewer line. It is important that the liner not float on the grout, so as to preserve the annular gap along the top of the liner pipe to be filled by the grout, which will protect the top of the liner pipe from damage after it sets up. Such relatively low density is also important in achieving low injection pressures, particularly in reducing head pressures which the injection pressure must overcome if the pipe is inclined upwardly and injection is being conducted at a relatively low point along the pipe, from which point the grout is proceeding upwardly. While the relatively low density of the grout of the present invention helps reduce such head pressure, it is nevertheless desirable that, if possible, such injection take place at a relatively high point so that the grout flows downstream along an inclined pipe, so as to eliminate head pressures altogether. This may not be possible in all cases, however, as is the case in an example which will be discussed below.

As described, the pumpable cement grout of the present invention has a wet density of from about 55 pounds per cubic foot to about 72 pounds per cubic foot. Roof deck type cellular concrete mixes have even lighter densities, which may typically range from 20 to 45 pounds per cubic foot; however, the water-to-cement ratio of such typical roof deck type mixes is typically about 0.5, rendering such roof deck type mixes much thicker and more difficult to pump than the pumpable cement grout of the present invention. Roof deck type cellular concrete mixes require the light weight which is provided by low density; however, a thin or runny consistency is not desired in such applications, because the roof deck is typically constructed to have a certain pitch, and it is undersirable for the mix to run down the pitched roof and into the gutter. Roof deck type cellular concrete mixes accordingly have a consistency which may be aptly described as similar to that of whipped cream or meringue, and thus do not readily flow down a pitched roof. If an attempt was made to pump such a typical roof deck type mix into the annular cavity between a sewer pipe and a plastic pipe liner, as described above with reference to FIG. 2, excessive friction would result from the thick, viscous consistency of the mixture, resulting in higher injection pressures which would likely cause collapse of the liner pipe. Furthemore, some such typical mixes have sand or other mineral aggregate material therein, which creates still more friction and excess pressure.

It should be noted at this point that, while the pumpable cement grout of the present invention may preferably be free of mineral aggregate material for most applications, it may be desirable in some applications to add fly ash to replace a portion of the cement in the grout in order to achieve cost savings, while still maintaining the desired density of the grout. Fly ash, as is well known to those skilled in the art, is a finely divided residue (powder resemblying cement) that results from the combustion of the pulverized coal in electric power generating plants. During combustion of the coal, mineral impurities (such as clay, feldspar, quartz, and shale) fuse and form spherical particles called fly ash. Such fly ash is inexpensive, and generally no processing is needed for using fly ash in blended cement.

Still further, it may be desirable in some applications to add superplasticizers to the grout of the present invention so as to reduce the amount of water used in the grout while maintaining the fluid consistency of the grout. As is known to those skilled in the art, superplasticizers are high range water reducers which are added to concrete, often to concrete having a low-to-normal slump and water-to-cement ratio, to make high-slump flowing concrete. Examples of such superplasticizer chemicals which are compatible with the preformed aqueous foam in the grout of the present invention include that available under the trademark "Mighty 150" from Boremco, Specialties Chemical Division, P.O. Box 02573, Fall River, Me. 02722, and under the trademark "WRDA 19" from W. R. Grace and Company, Derex Division, 62 Wittemore Avenue, Cambridge, Mass. 02140. Such superplasticizer chemicals may be a lignum-based product, and, as is known to those skilled in the art, act as a cement dispersant which releases particles of cement which surround water particles in ordinary cement or concrete mixes. Superplasticizer chemicals may be desirable because they permit the use of a lower water-to-portland cement ratio, thus creating higher strength in the hardened cement, without a corresponding reduction in fluidity. For example, from an exemplary mix of pumpable cement grout in accordance with the present invention, which may call for 1093.85 lbs/yd$^3$ cement, 743.14 lbs/yd$^3$ water, and 22.76 lbs/yd$^3$ foam, a reduction of about 100 pounds of water per cubic yard of mix may be achieved by adding about 10 ounces of typical superplasticizer chemical per 100 pounds of cement in the mix. A range of from about 6 ounces of superplasticizer per 100 pounds cement (which achieves a 60 lbs/yd$^3$ water reduction) to about 20 ounces of superplasticizer chemical per 100 pounds of cement (which achieves about a 100 lbs/yd$^3$ water reduction) may be used in the grout of the present invention; amounts of superplasticizer chemical in excess of 20 ounces per 100 pounds of cement may result in undesirable reduction in stability of the bubble structure of the grout.

Another additive which may be highly desirable for certain applications of the present invention is bentonite, which serves to inhibit extraneous water which may be present in the annular space from contaminating the grout by absorption. This may be particularly critical if the old concrete sewer pipe is badly deteriorated and significant amounts of water are flowing from the surrounding earth into the sewer pipe through fissures or holes in the wall of the pipe. Incorporating bentonite in the pumpable cement grout of the present invention may also help control bleeding of water from the grout, particularly when the grout is being injected against relatively high head pressures. Bentonite itself is a soft, porous, moisture absorbing pulverized rock material, comprising generally a colloidal native hydrated aluminum silicate (clay). Bentonite has the property of forming gels or viscous suspensions in combination with water, and may be useful in the pumpable cement grout of the present invention in amounts of about 5 to 10 pounds per cubic yard.

Having described the pumpable cement grout of the present invention and a method for its use, reference may advantageously be made to the results of two field tests conducted using the invention.

In the first field test, a 14 inch outside diameter HDPE pipe was jacked into an existing 15 inch inside diameter concrete pipe over distances greater than 300 feet. The small clearances involved, in this case only 1 inch difference in diameters, made it impossible to block the new liner in position. Accordingly, in order to insure that the new liner was encased in the protective grout, and did not float to the top of the sewer line, the HDPE liner pipe was filled with sewage having a density of about 62.5 pounds per cubic foot, and the grout was mixed to have a wet density of about 62 pounds per cubic foot.

A total of 5000 linear feet of the jacked-in HDPE liner pipe were backfilled with the pumpable cement grout of the present invention. The grout was pumped downstream so as to minimize pressure on the pipe. In order to provide the required protection for the HDPE pipe liner, the compressive strength of the grout needed to exceed 200 psi; once set, the grout installed in this field test developed compressive strengths exceeding 300 psi. Video cameras used to inspect the rehabilitated sewer after completion of the grouting operation detected no distortion in the HDPE liner pipe.

A second field test was conducted to grout an 18 inch outside diameter HDPE liner pipe which had been jacked into a 20 inch inside diameter concrete pipe over distances greater than 500 feet. A total of 4900 linear feet of HDPE liner pipe were backfilled using the grout of the present invention, mixed to have a wet density of 50 pounds per cubic foot.

A major problem in this project was that it was impractical to stop the flow of the sewer while the liner was being grouted. Accordingly, a plug containing holes for regulating the flow of sewage was installed in the downstream end of the new liner. Using this system, the flow of sewage was maintained, but enough sewage backed up to keep the section of liner full while it was being grouted. Careful monitoring of a backup bypass system prevented the sewer from overflowing through upstream manholes.

The grout was injected in a manner similar to that described above with reference to FIG. 2. The pump output was carefully controlled so that the grout injection pressure did not exceed 2 psi. The vent at the downstream end, which, in the manner described above, shows the air, water, and other materials being displaced as the grout is pumped through the annular space, was plugged when the undiluted grout appeared at the downstream bulkhead. The rapid set time of the grout allowed full sewer flow to be restored in less than six hours. Video inspection after completion of the grouting detected no deformation of the new liner.

In these projects, all grouting took place between manholes, so no excavation or drilling along the sewer line was required. Grout injection was monitored visually to insure that annular voids were completely filled and all water was displaced from the annular space between the old pipe and the new liner.

The proportions of the components of the grout of the present invention may be adjusted to provide grout having either higher or lower density, as may be desired for a particular project. For example, during the first field test described above, batches of grout mixes having a variety of unit weights, ranging from 59.96 to 69.86 pounds per cubic foot, were tested. The compressive strength of the solidified grout can be varied significantly, while maintaining an acceptable level of fluidity, by varying the amount of foam injected into the grout, and hence the density of the grout, within an acceptable range. For example, a grout backfill in accordance with the present invention, having a density of approximately 51 pounds per cubic foot, had an average 28 day compressive strength of 580 psi; for a ten percent increase in density to approximately 56 pounds per cubic foot, the average 28 day compressive strength increased 50 percent to 885 psi. One skilled in the art can adjust the proportions of portland cement, water, and pregenerated foam, within the ranges prescribed herein, to produce grout having a density between about 50 and about 75 pounds per cubic foot. Two exemplary mixtures in accordance with the present invention, each having a different density, are provided by the following tables:

TABLE 1

| MATERIALS | WEIGHT, LBS. | VOLUME, CF. | UNIT WT., PCF |
|---|---|---|---|
| Cement | 1093 | 3.23 | |
| Water | 634 | 10.16 | |
| | 1727 | 13.39 | 128.98 |
| Foam | 33 | 13.71 | |
| | 1760 | 27.10 | 64.94 |

TABLE 2

| MATERIALS | WEIGHT, LBS. | VOLUME, CF. | UNIT WT., PCF |
|---|---|---|---|
| Cement | 950 | 4.83 | |
| Water | 645 | 10.34 | |
| | 1595 | 15.17 | 105.14 |
| Foam | 28 | 11.83 | |
| | 1623 | 27.00 | 60.11 |

In using the foregoing grout and techniques in accordance with the present invention, the following factors have been found important in successful grouting of HDPE sewer pipe liners:

a) injection pressure should be closely monitored and carefully controlled by regulating the velocity and viscosity of the grout.

b) densities should be checked on every batch both before and after foaming to insure that the grout was properly batched.

c) variations and batched density should be corrected by adding water, foam, or both.

d) no batch older than two hours should be used on a long run.

e) pressure monitoring equipment should be carefully calibrated.

Properly trained personnel and quality control of the cellular foam concrete grout have also been found to be important factors in successful grouting of sewer pipe liners.

Figure 3:
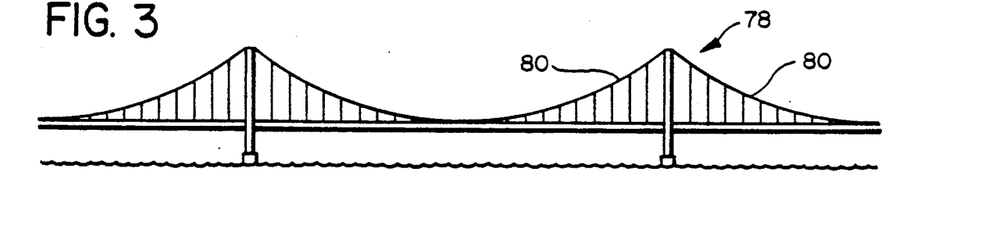
FIG. 3 is a side elevational view of a suspension bridge having wire stays suitable for grouting in accordance with the present invention.
Figure 4:
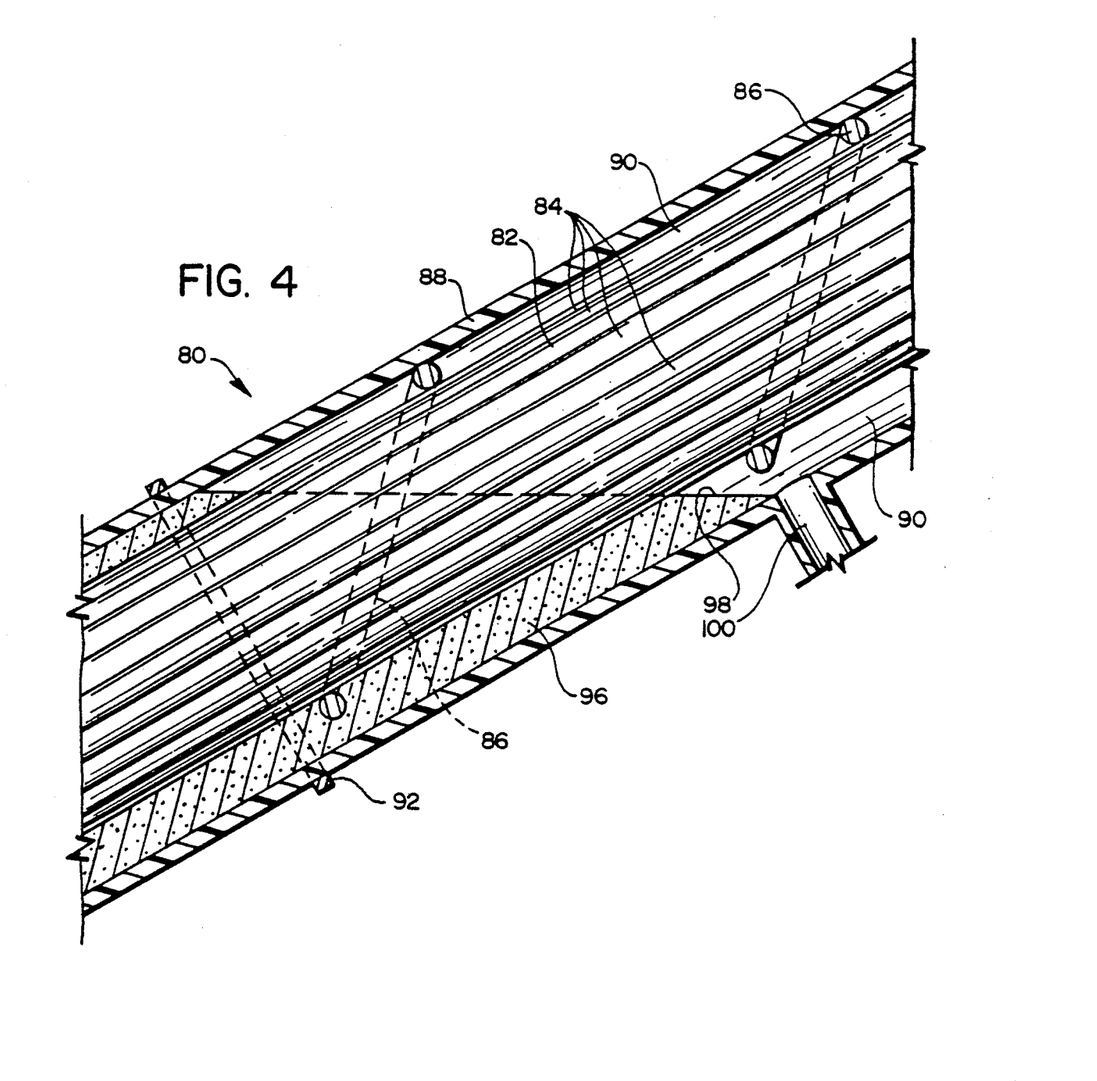
FIG. 4 is a longitudinal sectional view of a portion of a wire stay of the bridge of FIG. 3, showing the grouting thereof in accordance with the present invention.

The foregoing discussion has centered largely on the grouting of plastic liner pipes in sewer lines. With reference now to FIGS. 3 and 4, the use of the grout of the present invention to protect bridge wire cable stays will be described.

With reference to FIG. 3, there is seen a conventional bridge 78 having wire cable stays 80. It will be observed that bridge 78 may be provided with a great number of such cable stays 80, but for purposes of the following discussion only one such stay will be described.

With reference to FIG. 4, there is shown an enlarged sectional view of a wire cable stay 80, as was shown in FIG. 3. Wire cable stay 80 comprises a wire bundle 82, having a multiplicity of individual wire strands 84 therein. Wire strands 84, as noted above, are typically made of high tensile strength steel, and thus tend to corrode if exposed to the elements or to corrosive materials. Wire strands 84 are retained in wire bundle 82 by wire strand wrap 86, which is helically wrapped about wire bundle 82. Sheath pipe 88 encloses wire bundle 82 and wire strand wrap 86. Sheath pipe 88 may be secured about wire bundle 82 by clamps 92. Sheath pipe 88 is preferably a plastic pipe, such as, for example, a high density polyethylene pipe similar to that described above with regard to sewer liners. Sheath pipe 88 has an inside diameter which is greater than the outside diameter of wire bundle 82; accordingly, an annular void 90 is formed between wire bundle 82 and sheath pipe 88. With reference to FIG. 4, it will be noted that wire strand wrap 86 prevents sheath pipe 88 from resting directly on wire bundle 82 under the influence of gravity, thus preserving a substantially continuous annular void 90 about wire bundle 82.

As noted above, wire bundle 82 is subject to corrosion if exposed to the elements, particularly if exposed to water. While sheath pipe 88 may serve to deflect rain or other water from directly impacting wire bundle 82, seepage or condensation may penetrate sheath pipe 88. In order to keep such seepage or condensation from coming into contact with wire bundle 82, grout 96 is injected into annular space 90, in a manner substantially similar to that described above with reference to the injection of grout into the annular space between the concrete sewer pipe and plastic liner pipe. In this case, however, since complete and even filling of the annular space 90 about wire bundle 82 is desired, the injection is preferably conducted so that the injected grout 96 flows in an upward direction along the inclined wire stay 80. Accordingly, as was noted above, it will generally be desirable to use a grout in accordance with the present invention which has a relatively low density, so as to minimize head pressures and injection pressures. A grout mix in accordance with the present invention which is preferable for use in grouting wire bridge stays is provided in the following table

TABLE 3

| MATERIALS | WEIGHT, LBS. | VOLUME, CF. | UNIT WT., PCF |
|---|---|---|---|
| Water | 743 | 11.91 | |
| Cement (Type II) | 1093 | 5.56 | |
| Subtotal | 1836 | 17.47 | 105.09 |
| Foam | 38 | 16.57 | |
| TOTAL | 1874 | 34.05 | 55.04 |

The grout mix given in Table 3 has also been found to exhibit desirable characteristics for use in grouting pipe liners in sewer lines, as was described above with reference to FIG. 2.

With further reference to FIG. 4, it will be seen that the as the grout of the present invention is injected through sheath pipe 88 at a relatively low point along wire stay 80, a substantially horizontal upper edge or surface 98 of grout 96 moves upwardly through annular cavity 90. Upper surface 98 is thus similar to the grout leading edge 64 which was described with reference to FIG. 2. When upper surface 98 of grout 96 reaches drainage outlet 100, which penetrates sheath pipe 88 so as to establish fluid communication between annular cavity 90 and the outside, grout 96 will begin to run out of drainage outlet 100, thereby providing a visual indication to an observer that grouting of that stage of wire stay 80 has been completed. Injection of grout 96 may then be terminated, and grout 96 allowed to set up. Once grout 96 has set up, and thus forms a solid material which will not transmit head pressure to the lower portions of sheath pipe 88, grouting of the second stage of wire stay 80 may commence by injecting grout into annular cavity 90 through drainage outlet 100, until the second stage of the grouting is completed. The sequence may be repeated until the entire wire stay 80 has been grouted.

The solidified cellular foam concrete which results from the hydration (i.e. the setting up) of grout 96 is resistant to the penetration of water, thus preventing seepage or condensation from passing therethrough into contact with wire bundle 82. Grout 96 is thus effective in protecting wire bundle 82 from corrosion. It should be noted, however, that, since grout 96 itself is in direct contact with wire bundle 82, the cement and foam concentrate used to make up grout 96 for use in grouting bridge wire stays should be substantially free of chloride ions, sulfates, and other potentially corrosive agents.

The addition of microbubbled foam to cable stay grout 96 provides energy absorption capability to the grout. This addition of foam to cable stay grout gives cellular concrete a degree of semi-ductility and one-time shock or energy absorption which is significantly greater than that of non-foamed grout. In combination with the reduced weight load which is applied to cable bundles when using grout 96, this greater value of semi-ductility makes the cable stay grout of the present invention a better choice for bundle protection than conventional non-foamed grouts.

Furthermore, grout 96, mixed in accordance with Table 4, has much greater strength than the typical roof deck type cellular concrete mixes described above, inasmuch as grout 96 is provided with much more cement and water per unit volume than a typical roof deck type mixes, which have relatively greater foam portions and lower densities. Such conventional roof deck type mixes, however, possess inadequate strength to resist cracking if used to grout a wire bridge stay in the manner shown in FIG. 4; such cracks would readily permit the flow of water therethrough into contact with wire bundle 82.

As noted above, it may be desirable under some circumstances to replace relatively small portions of the water, cement, and foam used in the grout of the present invention with any of a wide variety of admixtures. Furthermore, the grout and method of the present invention may be used to fill a wide variety of void spaces, in addition to the exemplary void spaces shown between the sewer pipe and liner in FIG. 2, and between the wire bundle and sheath pipe in FIG. 4. It is to be recognized that these and various other modifications may be made to the illustrative embodiments without departing from the spirit and scope of the present invention. Accordingly, the invention is not to be limited except as by the appended claims.

What is claimed and desired to be secured by Letters Patent of the United States is:

1. A method for grouting an annular cavity formed intermediate a tubular external member having a longitudinal extent and an internal member disposed in said tubular external member, said method comprising:
    forming a pumpable cement grout, said grout comprising:
        portland cement;
        water in an amount sufficient so that the water-to-portland cement ratio of said grout is from about 0.6 to about 0.68 by weight; and
        pre-generated aqueous foam in an amount sufficient to adjust the wet density of said grout to a value of from about 55 to about 72 pounds per cubic foot; and
    pumping said pumpable cement grout into said annular cavity so that said grout fills said cavity by flowing in a generally longitudinal direction through said tubular external member.

2. The method of claim 1, wherein said tubular external member is a concrete sewer pipe and said internal member is a plastic liner pipe.

3. A method for lining a pipe, said pipe having a longitudinal extent and a predetermined internal diameter, said method comprising:
    placing a tubular liner in said pipe, said liner having an external diameter such that an annular cavity is formed intermediate said pipe and said liner, said liner further having a tendency to collapse if subjected to an external pressure which is in excess of a predetermined maximum pressure;
    forming a pumpable cement grout, said grout comprising:
        portland cement;
        water in an amount sufficient so that the water-to-portland cement ratio of said grout is from about 0.6 to about 0.68 by weight; and
        pre-generated aqueous foam in an amount sufficient to adjust the wet density of said grout to a value of from about 55 to about 72 pounds per cubic foot; and
    injecting said pumpable cement grout under pressure into said annular cavity at a first point along said pipe, so as to fill said annular cavity by flowing said grout substantially longitudinally within said pipe away from said first point towards a second point along said pipe; and maintaining said pressure of said injection substantially at or below said predetermined maximum pressure during said injection.

4. The method of claim 3, wherein said liner is high density polyethylene pipe, and wherein said maximum pressure is about 10 pounds per square inch.

5. The method of claim 4, wherein said pipe is a sewer line, and wherein said first and second points along said pipe are first and second access manholes along said sewer line.

6. The method of claim 5, further comprising the subsequent steps of:

terminating said injection of said grout; and permitting said grout to solidify in said annular cavity intermediate said pipe and said liner.

7. A method for lining a subterranean sewer line, said sewer line having an internal diameter equal to or less than about 60 inches, said sewer line further having access to the interior thereof from the surface at least first and second manholes at longitudinally spaced apart points along said sewer line, said method comprising:

placing a high density polyethylene pipe in said sewer line, said polyethylene pipe having an external diameter such that an annular cavity having a radial extent equal to or less than about 3 inches is formed intermediate said sewer line and said polyethylene pipe, said polyethylene pipe further having a tendency to collapse if subjected to an external pressure in excess of a predetermined maximum pressure equal to or less than about 10 pounds per square inch;

forming a pumpable cement grout, said grout comprising:

portland cement;

water in an amount sufficient so that the water-to-portland cement ratio of said grout is from about 0.6 to about 0.68 by weight; and pre-generated aqueous foam in an amount sufficient to adjust the wet density of said grout to an value of from about 55 to about 72 pounds per cubic foot;

forming a dam about said polyethylene pipe so as to seal said annular cavity between said pipe and said sewer line at said first access manhole, said dam having an injection port therethrough for establishing fluid communication between the surface and said annular cavity;

pumping said cement grout under pressure into said annular cavity through said injection port so that said cement grout fills said annular cavity by flowing in a generally longitudinal direction through said sewer line from said first access manhole towards said second access manhole, said pressure under which said cement grout is pumped into said annular cavity being maintained about equal to or less than said predetermined maximum pressure; and terminating said pumping of said cement grout into said annular cavity when said flow of said grout through said sewer line reaches said second access manhole.

* * * * *